Jan. 7, 1969  R. L. STEVENS  3,420,462
TENSION RESPONSIVE DRIVE FOR AN ENDLESS FILM PROJECTOR
Filed Nov. 18, 1966
FIG. 1
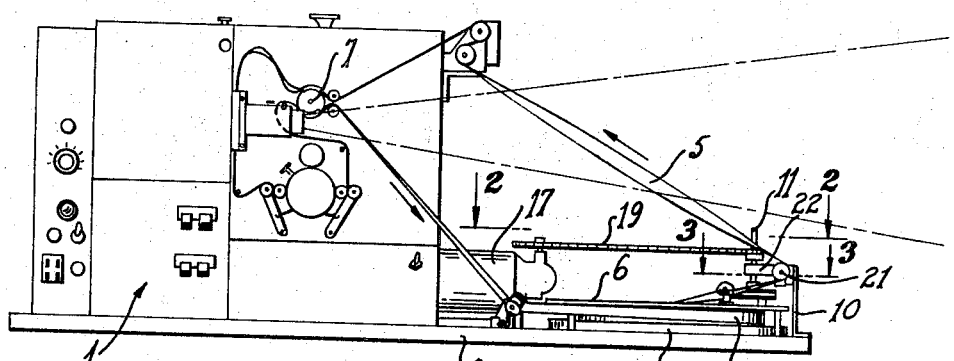
FIG. 2
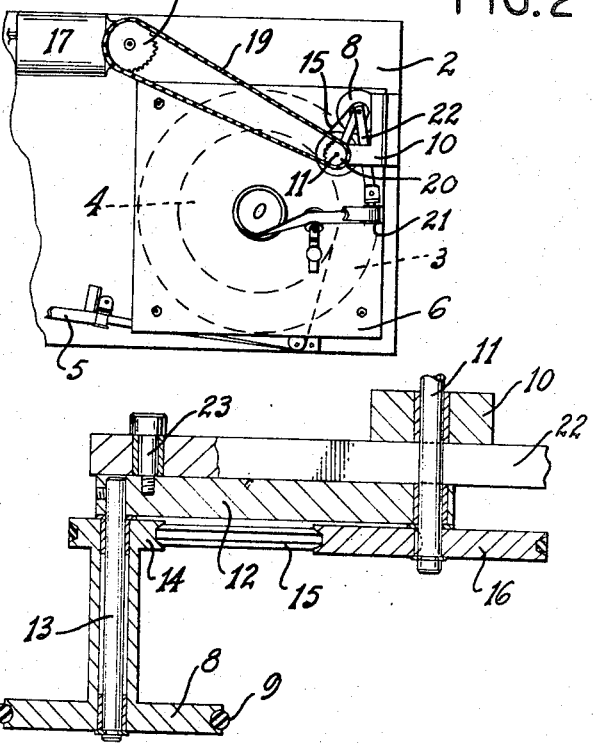
FIG. 3
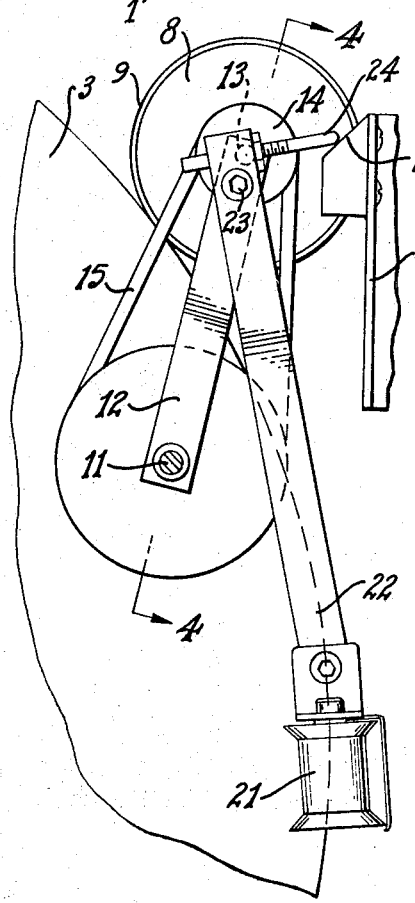
FIG. 4
INVENTOR.
RICHARD L. STEVENS.
BY
ATTORNEY

United States Patent Office 3,420,462
Patented Jan. 7, 1969

3,420,462
TENSION RESPONSIVE DRIVE FOR AN ENDLESS
FILM PROJECTOR
Richard L. Stevens, Long Beach, Calif., assignor to
Fannell, Inc., San Diego, Calif., a corporation of
California
Filed Nov. 18, 1966, Ser. No. 595,412
U.S. Cl. 242—55.19                            2 Claims
Int. Cl. B65h 17/48

ABSTRACT OF THE DISCLOSURE

A drive means for an endless film projector having a coil of film on a turntable peripherally driven by a wheel. A loop of the film engages a pulley on one end of a control arm to shift the arm in response to the tension in the film loop. Changes in the tension move the arm causing a pin on its opposite end to react with a cam to shift the drive wheel relative to the turntable to regulate the drive force exerted thereby.

---

This invention relates to a continuous reel drive for a motion picture projector, and particularly of the type where the film reel is so wound that the film may be continuously withdrawn from the center of the reel, and continuously returned to the periphery of the reel.

This application is a revival of my abandoned application on "Continuous Reel and Drive for a Motion Picture Projector," Ser. No. 351,927, filed Mar. 16, 1964.

An object of my invention is to provide a novel drive for the reel and film of a motion picture projector whereby the feeding of the reel into the projector is accomplished by the film feed mechanism of the projector itself.

Another object of my invention is to provide a novel drive for a continuous film in which the turntable on which the film reel is placed rotates slightly faster than the rate of withdrawal of the film from the reel, so that the film will be held substantially taut or compact in the reel.

Still another object of my invention is to provide a novel drive for the motion picture reel in which the drive mechanism is controlled by the tension of the film as that film is drawn into and through the motion picture projector.

Still another object of my invention is to provide a novel control for the turntable of the motion picture projector, in which the drive wheel engaging the turntable is variably engaged with the turntable by the tension of the film which is moving into and through the motion picture projector.

Other objects, advantages and features of the invention may appear from the accompanying drawing, the subjoined detailed description and the appended claims.

In the drawings

FIGURE 1 is a side elevation of a motion picture projector with my reel drive mechanism mounted thereon.

FIGURE 2 is a fragmentary vertical plan view taken from line 2—2 of FIGURE 1.

FIGURE 3 is an enlarged fragmentary sectional view taken on line 3—3 of FIGURE 1.

FIGURE 4 is a fragmentary sectional view taken on line 4—4 of FIGURE 3.

Referring more particularly to the drawing, the numeral 1 indicates a motion picture projector which is fixedly mounted on a base plate 2. The detailed construction of the motion picture projector is no part of this invention, other than the fact that my continuous reel drive is effective only with some type of motion picture projector. A turntable 3 is freely journaled on the base 2 and is continuously power driven by a means to be subsequently described. A coil of film 4 rests on the turntable 3 and rotates with the turntable. The film 5 reels off of the center of the coil of film 4 and moves into and through the motion picture projector 1 in the direction shown by the arrows in FIGURE 1. The return of the film 5 is to the periphery of the coil of film 4, all of which is usual and well known in the art. A cover plate 6 extends over the coil of film 4 and is spaced above the base 2 for the purpose of protecting the reel of film, and also to hold that reel in proper shape and position during the operation of the machine. The film 5 is fed through the projector 1 by the usual feed sprocket or sprockets 7, and again this is usual and well known in the art.

My drive mechanism for the coil of film 4, while resting on the turntable 3, consists of a drive wheel 8 which is moved into engagement with the periphery of the turntable 3 in order to drive that turntable. The drive wheel 8 is formed with a rubber or plastic tire or ring 9 on its outer periphery, so that it will more effectively engage the turntable 3. A bracket 10 is fixedly mounted on the base 2 and is positioned adjacent to the turntable 3. This bracket supports and journals a vertical shaft 11. A supporting arm 12 is journaled at one end on the shaft 11 and the other end of this supporting arm is permitted a slight swinging movement around the shaft 11 as a center, as will be subsequently described. A vertical shaft 13 is mounted in the outer end of the arm 12 and projects downwardly from that arm. The drive wheel 8 is in the form of a spool, and a pulley 14 is formed on the upper end of this spool. The pulley 14 and thence the wheel 8 is continuously rotated on the shaft 13 by means of the drive belt 15, which encircles the pulley 14 and a drive pulley 16 on the bottom of the shaft 11. The shaft 11 is power driven in one direction by means of the electric motor 17 which drives the sprocket 18 through an appropriate gear reduction. A belt or chain 19 encircles the sprocket 18 and another sprocket 20 on the shaft 11. Thus the shaft 11 will be continuously rotated, and the drive wheel 8 will also be continuously driven through the belt 15 and the pulleys 14–16, thus rotating the turntable 3 during the time that the wheel 18 is pressed against the periphery of the turntable.

Centrifugal force will tend to move the drive wheel 8 away from the turntable 3, and a slight force is necessary in order to press the drive wheel against the turntable and effect a nonslip driving engagement. To obtain this tensioning or pressure result, I provide a means controlled by the tension of the film 5 as it is pulled into the projector 1 by the feed sprocket 7. As the film 5 is pulled off of the center of the coil of film 4 it is threaded over a pulley 21, which is journaled on the outer end of a control arm 22. The end of the control arm 22 opposite the pulley 21 is pivotally attached to the arm 12, as shown at 23. A fulcrum pin 24 projects horizontally from the control arm 22 and engages a cam surface 25 on the bracket 10. Thus when the film 5 is tensioned it will pull the control arm 22 inwardly, due to the pull on the pulley 21, and this will cause a pivoting movement around the pin 24 which will cause a very slight rotation of the arm 12 around the shaft 11, thus swinging the drive wheel 8 inwardly against the periphery of the turntable 3 and resulting in an effective frictional drive to the turntable. If the tension on the film 5 lessens, centrifugal force will tend to move the drive wheel 8 away from the turntable 3 which results in slippage and, consequently, the film is not taken up on the coil of film 4 until the reel 5 again feeds into the projector at a rate to cause tension on the control arm 22. The amount of the drive wheel 8 towards and away from the turntable 3 is relatively small, since a slippage between the drive wheel 8 and the turntable 3 is enough to prevent spooling of the film onto the reel, and conversely a slight pressure is enough to exert a driving force to accomplish the required rewinding.

*In operation*

When the projector 1 is started the motor 17 is simultaneously started, which causes the film 5 to be drawn into the projector in the direction shown by the arrow in FIGURE 1. The motor 17 will rotate the drive wheel 8 continuously, and the pull of the film 5 on the spool 21 will rotate the arm 22 slightly, which will pivot the arm 12 around the shaft 11 to swing the wheel 8 against the periphery of the turntable 3. Thus the turntable will be rotated to spool the film 5 upon its coil of film 4. If the turntable 3 rotates slightly faster than required to spool in the film 5, then the film will slacken against the pulley 21, which will permit centrifugal force to move the drive wheel 8 slightly away from the turntable 3 and permit the film 5 to catch up with the requirements of the projector 1, that is, until tension is again applied to the incoming film 5, which again creates a tension on the pulley 21 to again swing the drive wheel 8 against the turntable 3 in the manner previously described. The tire or ring 9 on the wheel 8 is relatively soft and resilient, so that a slight pressure is required against the wheel 8 in order to effect a drive on the turntable 3. Any reduction in pressure on the drive wheel 8 will result in slippage, which is necessary under certain conditions as described above in order that the feed of the film into the projector may be correct and continuous, and without any sagging or undue looping of the film during its showing.

Having described my invention, I claim:

1. A continuous reel and drive for a motion picture projector including a base, a turntable journaled on the base, a film reel on said turntable, a drive wheel engaging the turntable to rotate the same, a bracket on said base, a shaft journaled in said bracket, drive means extending to the drive wheel to rotate the same, a pulley engageable by the film reach entering the motion picture projector, a supporting arm journaled on said shaft, a control arm mounted on said supporting arm and supporting the pulley, said pulley being journaled on the outer end of said control arm, and a fulcrum pin on the control arm, and a cam on the bracket engaged by the fulcrum pin.

2. A continuous reel and drive for a motion picture proector including a base, a turntable journaled on the base, a film reel on said turntable, a drive wheel engaging the turntable to rotate the same, a bracket on said base, a shaft journaled in said bracket, drive means extending to the drive wheel to rotate the same, a pulley engageable by the film reach entering the motion picture projector, a supporting arm journaled on said shaft, a control arm mounted on said supporting arm and supporting the pulley, said pulley being journaled on the outer end of said control arm, and a fulcrum pin on the control arm, and a cam on the bracket engaged by the fulcrum pin, said control arm being pivotally mounted on the supporting arm at the end adjacent said drive wheel, and said fulcrum pin being also positioned on the control arm adjacent the drive wheel.

References Cited

UNITED STATES PATENTS

| | | | |
|---|---|---|---|
| 1,207,211 | 12/1916 | Power | 242—75.5 |
| 1,326,997 | 1/1920 | Uebelmesser. | |
| 2,307,806 | 1/1943 | Schnoor | 242—55.19 |
| 2,657,871 | 11/1953 | Pettus | 242—55.14 |
| 2,706,629 | 4/1955 | Cailliot | 242—55.19 |
| 3,150,841 | 9/1964 | Stevens | 242—55.19 |

BILLY S. TAYLOR, *Primary Examiner.*

U.S. Cl. X.R.

242—65, 75.1